(No Model.) 7 Sheets—Sheet 1.

A. J. DENOYER.
MACHINERY FOR MANUFACTURING SATCHEL BOTTOMED PAPER BAGS.

No. 515,199. Patented Feb. 20, 1894.

WITNESSES:
George Baumann
James Gracie

INVENTOR
Achille Joseph Denoyer
BY
Howson and Howson
ATTORNEYS

(No Model.) 7 Sheets—Sheet 3.

A. J. DENOYER.
MACHINERY FOR MANUFACTURING SATCHEL BOTTOMED PAPER BAGS.

No. 515,199. Patented Feb. 20, 1894.

WITNESSES:
George Baumann
James Gracir

INVENTOR
Achille Joseph Denoyer
BY
Howson and Howson
ATTORNEYS (No Model.)   7 Sheets—Sheet 4.

A. J. DENOYER.
MACHINERY FOR MANUFACTURING SATCHEL BOTTOMED PAPER BAGS.

No. 515,199.   Patented Feb. 20, 1894.

WITNESSES:
George Baumann
James Gracis

INVENTOR
Achille Joseph Denoyer
BY
Howson and Howson
ATTORNEYS

THE NATIONAL LITHOGRAPHING COMPANY,
WASHINGTON, D. C.

(No Model.) 7 Sheets—Sheet 5.

A. J. DENOYER.
MACHINERY FOR MANUFACTURING SATCHEL BOTTOMED PAPER BAGS.

No. 515,199. Patented Feb. 20, 1894.

WITNESSES:
George Baumann
E. J. Griswold

INVENTOR
Achille Joseph Denoyer

BY
Howson & Howson
his ATTORNEYS.

(No Model.) 7 Sheets—Sheet 6.

A. J. DENOYER.
MACHINERY FOR MANUFACTURING SATCHEL BOTTOMED PAPER BAGS.

No. 515,199. Patented Feb. 20, 1894.

WITNESSES:
George Baumann
E. J. Griswold

INVENTOR
Achille Joseph Denoyer
BY
Howson & Howson
his ATTORNEYS.

(No Model.) 7 Sheets—Sheet 7.

A. J. DENOYER.
MACHINERY FOR MANUFACTURING SATCHEL BOTTOMED PAPER BAGS.

No. 515,199. Patented Feb. 20, 1894.

WITNESSES:
George Baumann
L. J. Griswold

INVENTOR
Achille Joseph Denoyer
BY
Howson & Howson
his ATTORNEYS.

UNITED STATES PATENT OFFICE.

ACHILLE JOSEPH DENOYER, OF FONTAINEBLEAU, FRANCE.

MACHINERY FOR MANUFACTURING SATCHEL-BOTTOMED PAPER BAGS.

SPECIFICATION forming part of Letters Patent No. 515,199, dated February 20, 1894.

Application filed February 3, 1893. Serial No. 460,873. (No model.) Patented in France July 13, 1892, No. 222,968.

*To all whom it may concern:*

Be it known that I, ACHILLE JOSEPH DE-NOYER, proprietor, a citizen of the Republic of France, residing in Fontainebleau, (Seine-et-Marne,) France, have invented Machinery for the Manufacture of Square or Satchel Bottomed Paper Bags, (for which I have obtained a French patent, dated July 13, 1892, No. 222,-968,) of which the following is a specification.

This invention relates to machinery for the manufacture of square or satchel bottomed paper bags having an advertisement or other impression printed upon them if required. The general arrangement and details of this improved machinery as hereinafter described are such as to enable it to turn out finished bags with great rapidity and the bottoms of the bags are effectually closed so as to render it practically impossible for their contents to escape being moreover folded on the side of the longitudinal seam or joint, that is to say on the opposite side to that on which the printing is performed, this printing being performed in the same machine so that the bags are discharged from the machine completely finished and ready for packing.

In order that the said invention may be fully understood I shall now proceed more fully to describe the same, and for that purpose shall refer to the several letters and figures on the annexed sheets of drawings, the same letters and figures of reference indicating corresponding parts in all the views.

Figure 1:
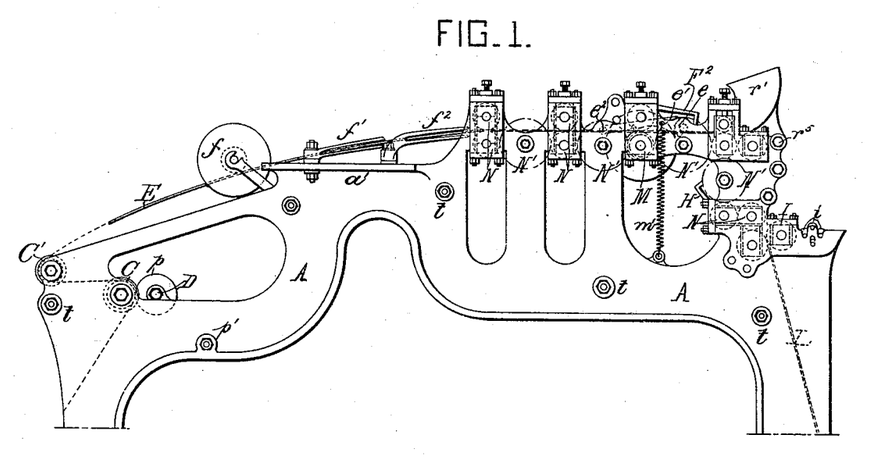
Figure 1 of the accompanying drawings represents, in side elevation, the upper part of a machine constructed according to this invention.
Figure 2:
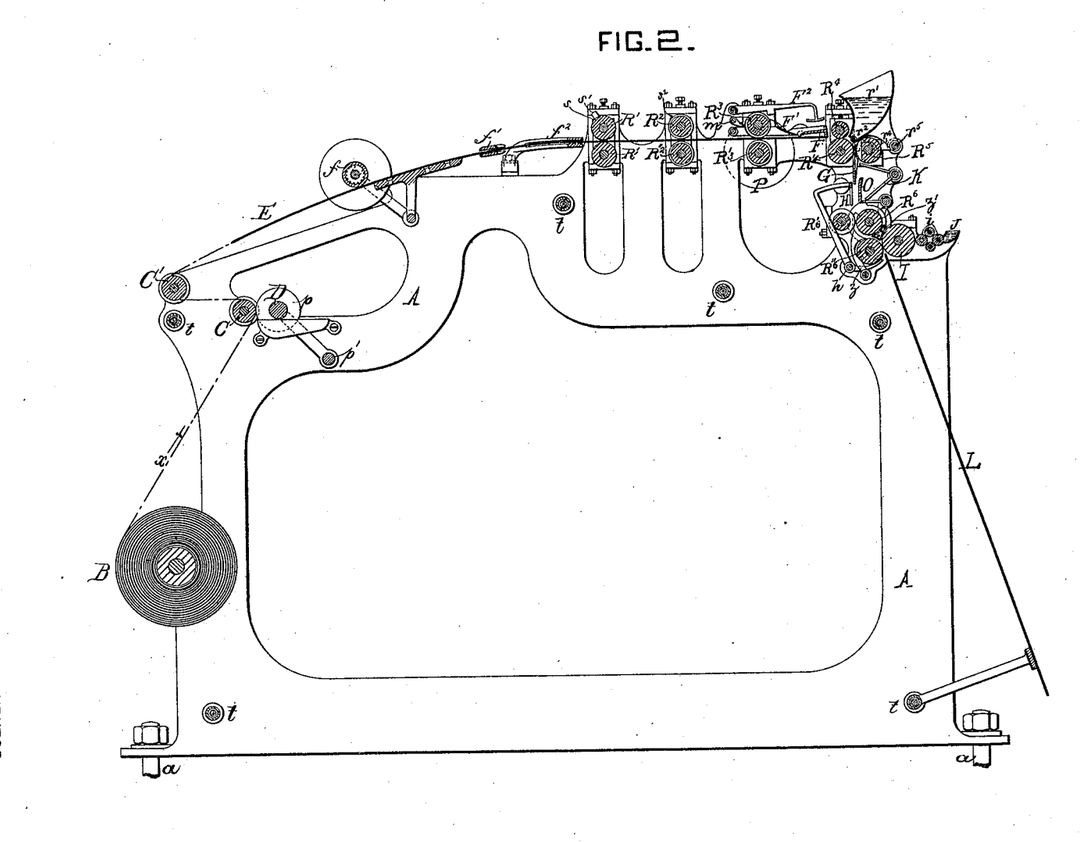
Fig. 2 represents the machine in vertical section taken along the longitudinal axis of the machine.
Figure 3:
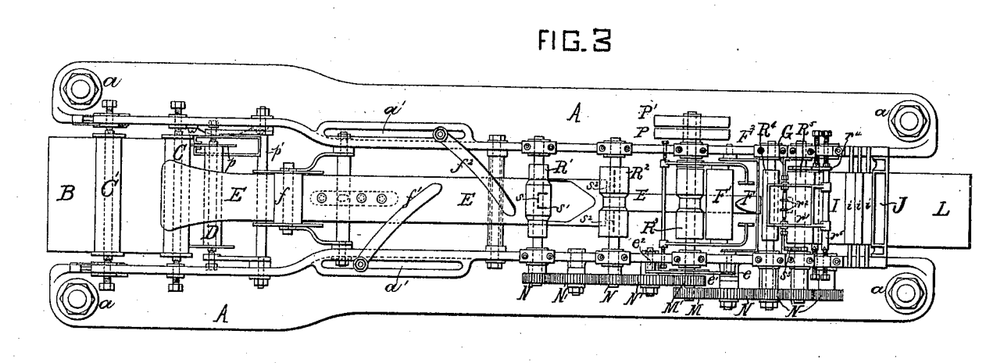
Fig. 3 represents the machine in plan.

The machine illustrated in the drawings is constructed with two side frames A connected together by transverse bars or ties $t$, Figs. 1, 2 and 3, and supporting all the moving and other devices employed in the manufacture of the bags. The frame, of suitable shape and dimensions, is secured to the ground by bolts $a$.

At the rear end of the machine there is a spool B capable of rotating freely upon its bearings and the endless or continuous band of paper employed in making the bags is wound upon this spool. The said paper marked $x$ in the drawings passes over a roller C rotating upon points where it receives along on one edge a streak of strong paste or other suitable composition which is deposited upon it by a disk $p$ rotating in a trough attached to one of the side frames. The pasting disk $p$ works upon a shaft D carried by arms rocking upon a center $p'$, so that it is pressed by its own weight against the roller C. The paper $x$ passes from this roller over a second roller $C'$, rotating upon points in the same way as the first roller whence it is guided onto a table or mold plate E constituted by a sheet of steel curved and widened at the rear end. Toward the front end this sheet becomes narrower, its width being gradually reduced to the width of the folded bag represented at X, Fig. 13, after which its width is suddenly contracted to the dimension indicated at X', Fig. 13, corresponding with the width of the flaps at the bottom of the bag. The paper $x$ is maintained upon this table or mold E by a roller $f$, Figs. 1, 2 and 3, carried by oscillating arms and presses against the paper by its own weight. With the same object two copper forks or blades $f'$, $f^2$, Fig. 5, are employed being capable of sliding for the purpose of adjustment in grooves $a$, in the frame to which they are attached by means of bolts and nuts.

Figures 10, 11:
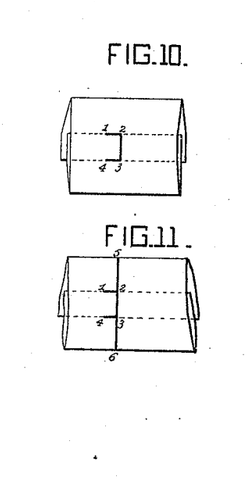
Figs. 10, 11, 12, 13, 14, 15 and 16 represent a bag in different stages of its manufacture.
Figure 12:
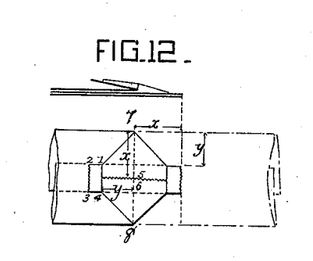
Figure 18:
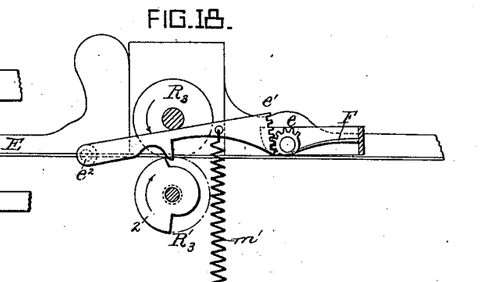
Figs. 18 to 23 are enlarged detached views of details.
Figure 18A:
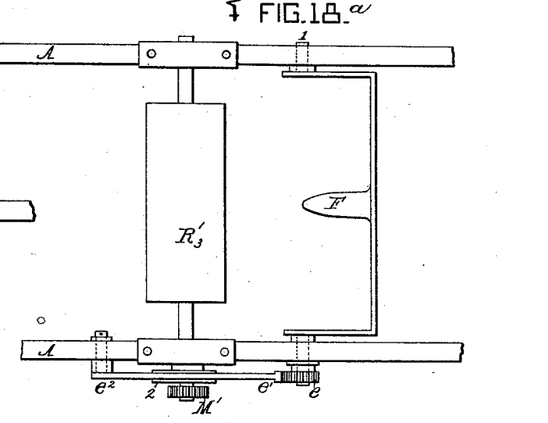
Figure 19:
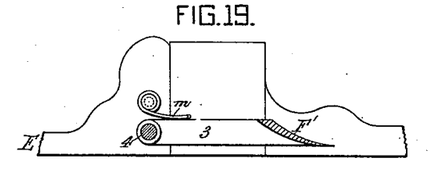

The roller $f$ is provided with flanges which turn down the edges of the band of paper which project beyond the edges of the table or mold E on each side and the forks $f'$ $f^2$ crease or fold these parts back under the said mold so as to form a species of flattened tube or sheath upon the latter. The forks are so arranged that one side of the paper is folded in advance of the other and the part which has received the paste is the last to be folded so that it is enabled to adhere to the other part and prevent the sheath or tube from opening. The paper sheath in this flattened form passes between two rollers $R_1$ and $R_1'$, which commence the cutting out of the flaps of the bottom. For this purpose the upper roller or cylinder $R_1$ is provided on one of its generating lines with a short blade $s$ preferably formed with saw teeth or notches and with knives $s'$ arranged at right angles to the blade $s$ and the lower roller $R_1'$ is provided with corresponding recesses acting in combination with the blades $s\ s'$ so as to form shears which cut the paper above and below the mold E which is cut away at this part. These two cutting cylinders or rollers form the two flaps for the bottom by cutting the paper as indicated by the line 1, 2, 3, 4, Fig. 10, being arranged in vertical guides on the frame so that their bearings can be adjusted at any required level. After this cutting operation the sheath of paper passes between two other cylinders or rollers $R_2$ and $R_2'$ supported in the same way as the preceding rollers but being of somewhat different shape. Each of these cylinders is provided with a circular groove situated in the direction of the length of the machine (Fig. 3) and on each side of the groove the upper roller carries a saw blade $s^2$ arranged in the direction of its generating line and acting in combination with a corresponding groove in the lower cylinder and a lateral recess in the mold E for the purpose of cutting the paper along the lines 2—5 and 3—6, Fig. 11, on each side of the flaps and severing a length of paper sufficient to make one bag. The cut out end of the sheath or tube then passes between two feed rollers $R_3$ and $R_3'$ and on emerging from between these rollers comes in contact with a plate or blade F Figs. 4, 18 and 18ª. This blade F is a simple tongue carried on a light frame pivoted at $l, l$ to the frame A, and the said blade is introduced between the mold E and the upper flap so as to turn back the latter, as indicated in Figs. 5 and 12 upon a second pivoted blade F' retained in position by a spring $m$ attached to the frame (see Figs. 19 and 19ª). One of the axes of oscillation of the blade F is provided with a pinion $e$ (Figs. 1, 3, 18 and 18ª) gearing with a toothed segment $e'$ oscillating on the center $e^2$ and attached to a counter spring $m'$ which constantly tends to draw it downward. A cam 2 fixed on the axis of the drawing cylinder $R_3'$ transmits the necessary up and down movements to the sector $e'$.

Figure 19A:
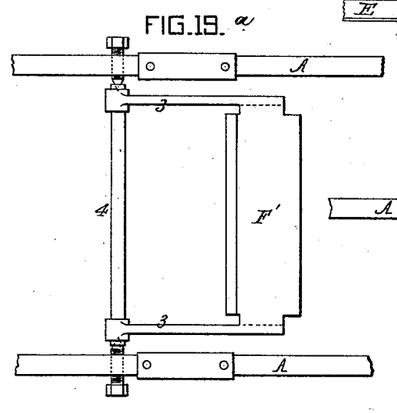
Figure 20:
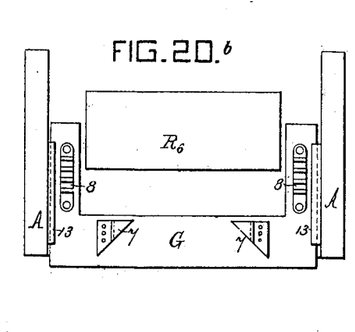
Figure 20A:
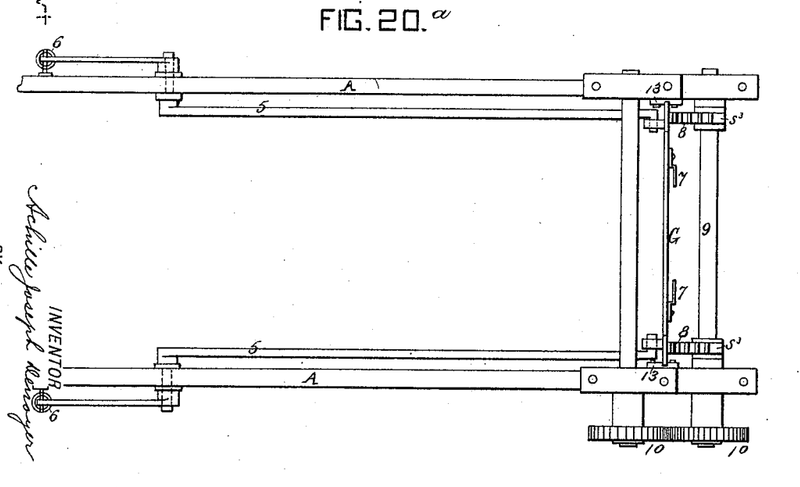

It will be observed that from the rollers $R_2$ and $R_2'$ to the blade F where it terminates the mold E is of the same width as the flap at the bottom of the bag and that the fold 7—8 produced in folding back the upper flap is formed by the edge of the blade F', which is nearly as wide as the space between the frames A A. This blade F' is fixed by arms 3, 3, to an axis 4 mounted on pivots in the frames A A, see Fig. 19ª and the spring $m$ tends to constantly press this blade onto the table E.

Figure 4:
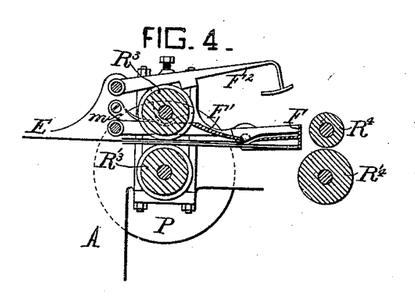
Figs. 4, 5, 6, 7, 8 and 9 drawn to a larger scale, illustrate in detail the parts employed for performing the various operations necessary for the manufacture of the bags.
Figure 5:
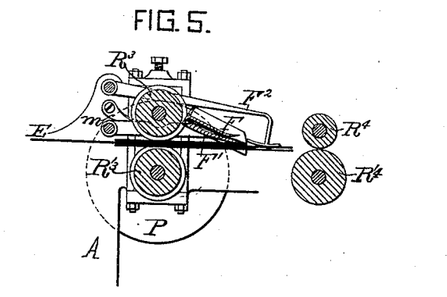

In order to prevent the turned down part of the tube or sheath from springing up a third blade $F^2$, Figs. 3, 4 and 5, made in two parts presses upon it as it enters between the two compressing cylinders $R_4$ and $R_4'$. The two arms of this blade are attached to an axis oscillating upon points and are actuated by a cam fixed upon the axis of the upper roller $R_3$ (Fig. 3).

Figure 6:
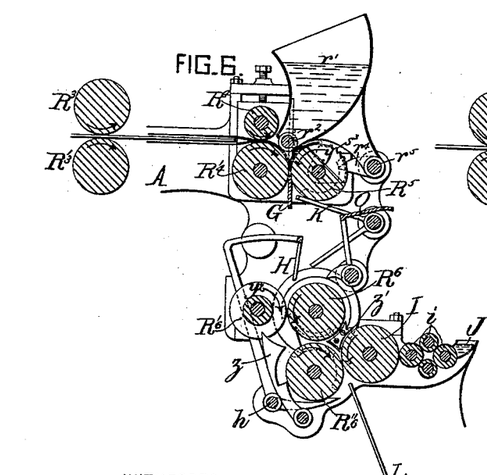
Figure 7:
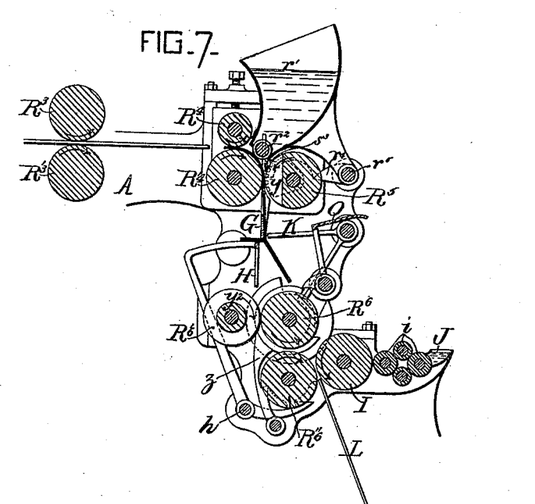
Figure 8:
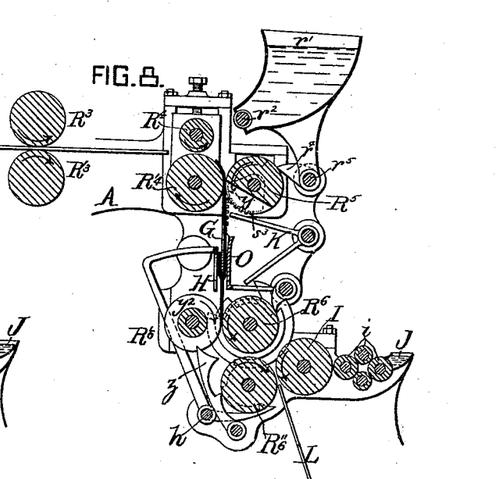
Figure 9:
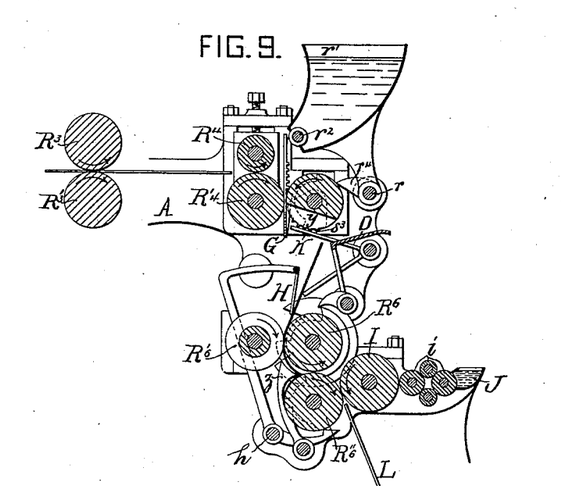
Figure 13:
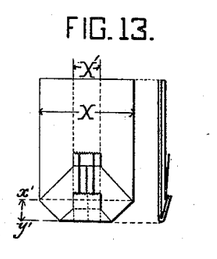
Figure 21:
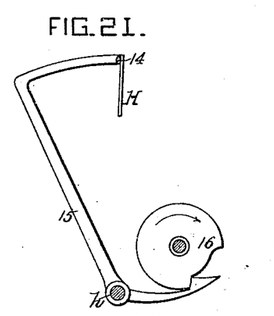
Figure 21A:
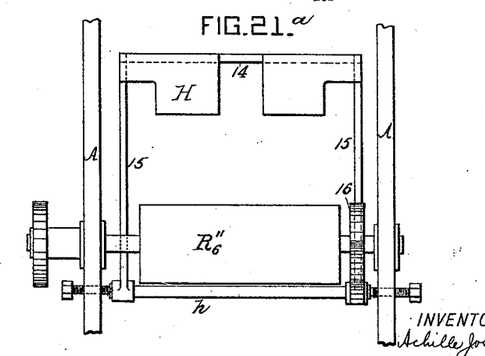

When the bottom of the bag has been opened and pressed as indicated in Fig. 12 the lower flap is folded as indicated in Fig. 13 and at the same time the bottom receives two streaks of paste by means of which the folds are subsequently caused to adhere together. The fold of the lower flap is formed by the bottom edge of a paste reservoir $r'$, Fig. 6, which, being lowered when the said flap projects to the required extent, creases it, tucks it between rollers $R_4'$ and $R_5$ which draw forward the paper tube and guide it downward in a vertical direction as indicated in Fig. 7. At the same time two disks $r^2$, rotating at the lower part of the trough $r'$ deposit streaks of paste hereinbefore referred to. The descending and ascending movements of the trough are obtained by the aid of a cam acting in combination with a tappet $r^4$ connected with a rock shaft $r^5$ supporting the trough, Figs. 6, 7, 8 and 9. The cam which lowers the trough elevates it when the first fold has been formed and the streak of paste deposited. The paper tube now presents the appearance indicated in Fig. 13. The roller $R_5$ is recessed at $y$, Fig. 7, in order that it may not come in contact with the paste on the bottom of the bag. On emerging from between the rollers $R_4'$ and $R_5$ the tube engages with a vertical guide G, Figs. 6, 7, 8, 9, 20, 20ª and 20ᵇ. This guide G is a metallic plate mounted on levers 5, 5, pivoted to the frames A A, Figs. 20, 20ª and 20ᵇ, and springs 6, 6 constantly tend to raise the plate. Small lateral flanged pieces 7, 7 are attached to the plate at a distance apart equal to the width of the tube flattened out, and the tube engages between these flanged pieces after leaving the rollers $R_4'$ and $R_5$. The guide plate G is also provided with toothed racks 8, 8 which engage with toothed segments $s^3$ to lower the guide at required intervals. As soon as the sectors leave the racks the guide is automatically raised by the action of the springs 6, 6. The axis 9 of the sectors $s^3$ is provided with a gear wheel 10 engaging with a gear wheel 11 wedged onto the axis of the cylinder $R_4'$. The plate is guided in vertical grooves 13, 13 on the frames A A. The tube projects beyond this guide for a distance indicated by $x'\ y'$, Fig. 13, and when in this position the fold formed in the first instance is drawn back by a blade H oscillating on a rock shaft $h$ which turns the bottom over into the horizontal position indicated in Figs. 7 and 14 by creasing it against the lower edge of the guide G. This blade H, shown more particularly in Figs. 21 and 21ª is formed by two metallic plates mounted on a cross-bar 14 so as to leave a space in order that the blade can not wipe off the paste which has been deposited upon the bottom of the bag. The cross-bar 14 has two arms 15, 15 which are fixed to the rock shaft $h$ mounted on pivots in the frames A, A. One of the arms 15 is prolonged beyond the shaft $h$, and is acted upon by a cam 16 fixed on the shaft of the cylinder $R_6''$ to actuate the blade H.

Figure 22:
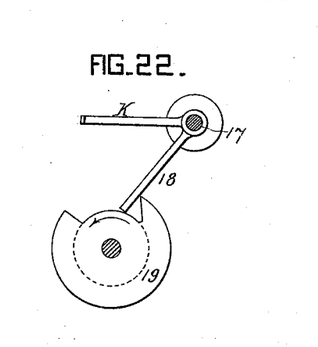
Figure 22A:
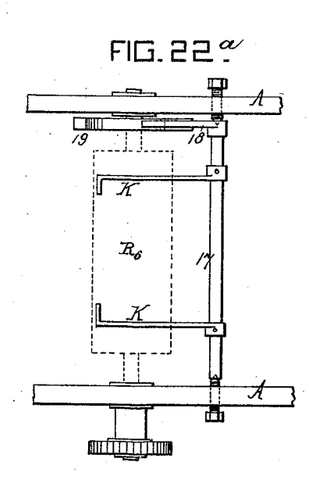

Referring to Figs. 22 and 22$^a$, the part K is formed of two arms fixed on an axis 17 which is mounted on pivots in the frames A A. An arm 18 also fixed on the axis 17 is acted upon by a cam 19, keyed onto the axis of the roller $R_6$. The contour of this cam is such that the arms K are raised and lowered at the desired moment. The arms K K are a distance apart equal to the width of the tube, and the outer ends of the arms have each a square turn which, when the bottom of the bag has been turned over by the blade H, seize the upper flap and cause it to incline slightly downward in order to prepare it to be acted upon by a blade O which turns it completely down and directs it toward the cylinders $R_6 R_6'$.

Figure 14:
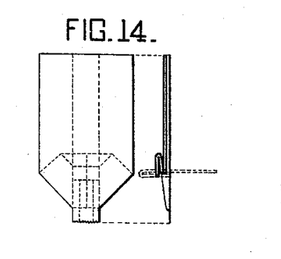
Figure 15:
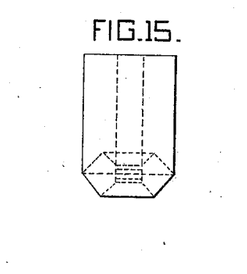
Figure 16:
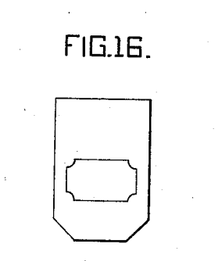
Figure 23:
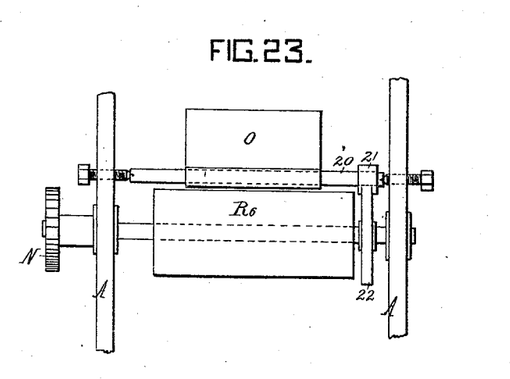
Figure 23A:
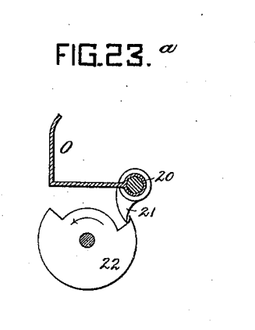

The blade O, Figs. 23 and 23$^a$ is formed by a bent metallic plate fixed on an axis 20 mounted on pivots in the frames A A. Also fixed on the axis 20 is an arm 21 in contact with a cam fixed on the shaft of the cylinder $R_6$, to actuate the blade O. This blade O acts as a guide for the bag, which slides between it and the blade H. When the bag bottom has been turned over toward the side on which the longitudinal seam in the body of the bag is situated and the flap which is not folded projects forward as indicated in Fig. 14, the bag being pushed forward by the guide G becomes engaged between the two rollers $R_6$ and $R_6'$, the latter being provided with a circular recess $y^2$ (Fig. 6) in order that it may not come in contact with the two streaks of paste which have been deposited upon the bottom. The forward movement brings the unfolded flap into contact with a tucker or folder $z$ worked by a cam, and which by pressing against the said flap creases it and tucks it in between the roller $R_6$ and a roller $R_6''$. This flap is thus folded over the flap folded in the preceding operations and the two flaps adhering together close the bottom of the bag (Fig. 15). When the bag has become engaged between the propelling rollers $R_6$ and $R_6'$ the guide G immediately ascends to its original position (Figs. 6 and 9) so as to admit of the return movement of the blade H in order to enable the latter to act upon the succeeding bag.

Figure 17:
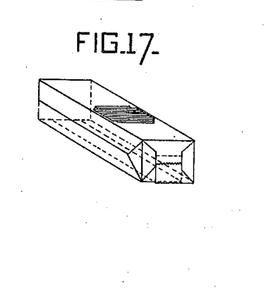
Fig. 17 illustrates in perspective a finished bag opened and ready for filling.

The finished bag may be allowed to fall directly on to an inclined board or chute L by which it is directed into a suitable receptacle or in place of allowing it to fall in this way it may be printed with any suitable impression in accordance with the purpose for which it is to be employed. The printing apparatus employed for this purpose is attached to the machine and is provided with a printing roller I carrying an engraved block or the like which is inked by inking rollers $i$ supplied with ink from the ink trough J. The said printing roller transmits the ink and deposits it in the required place upon the bag by pressing against the roller $R_6''$. By these means the finished bag is printed in passing between the rollers $R_6''$ and I, the printing being performed on the side of the bag opposite to that on which the bottom is folded back. In its passage between the rollers $R_6''$ and I the bag is guided by a fixed guide $z'$. The bag being thus finished, folded, pasted and printed slides down the chute L. When opened for the purpose of receiving the goods it presents the form indicated in perspective in Fig. 17, its bottom being effectually cemented together is perfectly closed so that it is impossible for the contents to escape.

The arrangements hereinafter described are employed for transmitting motion to the working parts of the machine. The first motion is taken from the shaft of the feed or propelling cylinder $R_3'$ provided with fast and loose pulleys P P'. The other extremity of this shaft is provided with gear wheels M and M' gearing respectively with a series of wheels on the right and on the left which transmit motion to the several propelling cylinders or rollers hereinbefore described. The gear wheels marked N are fixed upon the shafts of the rollers and the wheels marked N' being simply intermediate wheels, are loose upon their shafts or studs.

The movement of the part employed for creasing or forming the bottom of a bag is obtained by means of cams acting upon wipers maintained in contact with their respective cams by means of springs as described hereinbefore. The proportions of the toothed gearing and the profile and angle of the cams are calculated in such a manner as to cause the movements to take place at the required times.

All the propelling cylinders or rollers R are of the same diameter, their development corresponding with the length of paper required to form one bag and the movement of the paper being continuous the transmission of the movements is greatly facilitated.

In this machine the work is divided as follows: First. Depositing the paste by means of the disk for cementing the lateral body or body seam. Second. Turning down into a vertical position the parts of the paper projecting on each side of the table or mold by means of the roller $f$. Third. Folding or creasing these parts underneath the mold by means of the forks $f'$ and $f^2$. Fourth. Cutting out the flaps by means of the cylinder or roller $R_1$ and $R_1'$. Fifth. Severing the quantity of paper necessary for making one bag by the rollers $R_2$ and $R_2'$. Sixth. Opening the bottom by the blade F. Seventh. Forming the first fold and depositing the paste for cementing the bottom by means of the trough $r'$ and the rollers $R_4'$ and $R_5$.

Eighth. Turning over the bottom to the side on which the lateral seam is situated by the action of the blades H K O and the guide G. Ninth: Forming the second fold and closing the bottom by the action of the tucker $z$ and the rollers $R_6$ and $R_6''$. Tenth. Printing on the bags by means of the cylinder I. It will be seen that by this subdivision of the work the manufacture is enabled to proceed uninterruptedly, all the ten bags in the machine being in different stages of completion. It results from this subdivision of the work from the continuous motion of the paper, from the simplicity of the parts and of the mode of driving them that the machine is enabled to manufacture the bags with ease at the rate of about two per second or at the rate of seventy two thousand per working day of ten hours, when dealing with bags of moderate size (say about four and one-fourth inches by two and one-fourth inches.

Each size of bag requires a machine of corresponding dimensions to make it but the arrangement of the mechanism is the same. In practice about twelve different sizes of machines are required. Each machine is also capable of making lined bags, it being simply necessary for this purpose to provide two spools B at the rear of the machine, one spool supplying the inside paper and the other the outside paper.

I do not limit myself as to the proportions and dimensions and other details of the parts hereinbefore described and illustrated in the drawings which may evidently be modified according to the nature of the work which they are required to perform.

I claim as my invention—

1. In a machine for making paper bags, the combination of a table or former, a pair of rollers, one above and one below the table to draw forward the paper, and a pasting disk; with a roller adapted to rest on the table above the paper strip and provided with flanges to turn down the edges of the paper beyond the edges of the table, and a pair of forks, one ahead of the other to crease and fold back under the table the turned down edges of the paper to form a flattened tube, substantially as set forth.

2. In a machine for making paper bags, having a continuous feed of paper in the form of a flattened tube, the combination of a pivoted blade F adapted to enter the end of the said flattened tube, with a blade F' adapted to rest on the tube, and means for turning the blade F with one side of the flattened tube, back onto the blade F' to open and crease the end of the tube to form the bottom of the bag and the blade $F^2$, all substantially as and for the purposes set forth.

3. In a machine for making paper bags, the combination of the movable guide G, with oscillating blades H, K, and O, to turn over the partially formed bottom of the bag to the side of the tube on which the longitudinal seam is situated, all substantially as set forth.

4. In a machine for making paper bags, the combination of a movable guide G, and oscillating blades H, K, and O, with guide rollers $R_6$, $R_6'$ and $R_6''$, and an oscillating tucker $z$, substantially as and for the purposes set forth.

In testimony whereof I have signed my name to this specification in the presence of two subscribing witnesses.

ACHILLE JOSEPH DENOYER.

Witnesses:
LEON FRANCKEN,
ROBT. M. HOOPER.